(12) United States Patent
Hong

(10) Patent No.: US 7,121,229 B2
(45) Date of Patent: Oct. 17, 2006

(54) METHOD AND SYSTEM FOR EVALUATING INTEREST OF A TESTED ANIMAL

(76) Inventor: Chen-Jee Hong, No. 201, Sec. 2, Shih-Pai Rd., Taipei (TW)

( * ) Notice: Subject to any disclaimer, the term of this patent is extended or adjusted under 35 U.S.C. 154(b) by 112 days.

(21) Appl. No.: 10/879,371

(22) Filed: Jun. 29, 2004

(65) Prior Publication Data

US 2005/0284398 A1    Dec. 29, 2005

(51) Int. Cl.
*A01K 1/03* (2006.01)
(52) U.S. Cl. ..................................... 119/421
(58) Field of Classification Search ............... 119/417, 119/416, 418, 419, 420, 421, 702, 452, 453, 119/454, 455, 456, 475, 72, 72.5; D30/108
See application file for complete search history.

(56) References Cited

U.S. PATENT DOCUMENTS

| | | | | |
|---|---|---|---|---|
| 3,334,614 A | * | 8/1967 | Gass et al. ................... | 119/475 |
| 3,788,277 A | * | 1/1974 | Willinger et al. ............ | 119/700 |
| 3,791,346 A | * | 2/1974 | Willinger et al. ............ | 119/456 |
| 3,865,082 A | * | 2/1975 | Lovitz et al. ................ | 119/452 |
| 5,088,446 A | * | 2/1992 | Campiotti .................... | 119/421 |
| 5,893,338 A | * | 4/1999 | Campbell et al. ............ | 119/475 |
| 6,295,950 B1 | * | 10/2001 | Deitrich et al. ............. | 119/419 |
| 6,463,879 B1 | * | 10/2002 | Campbell et al. ........... | 119/72.5 |
| 6,526,915 B1 | * | 3/2003 | Gabriel et al. .............. | 119/72.5 |

* cited by examiner

*Primary Examiner*—Trinh Nguyen
(74) *Attorney, Agent, or Firm*—Christensen O'Connor Johnson Kindness PLLC

(57) ABSTRACT

In a method and system for evaluating interest of a tested animal, first and second dispensers for dispensing respectively a vital first liquid and a second liquid are provided in a closed space confined by a housing for containing the tested animal. The first dispenser dispenses the first liquid at a first position that is easily accessible to the tested animal. The second dispenser dispenses the second liquid at a second position higher than the first position so as to be less easily accessible to the tested animal. Amounts of the first and second liquids consumed by the tested animal within a predetermined time period are measured. The consumed amounts of the first and second liquids are subsequently compared to evaluate interest of the tested animal.

5 Claims, 6 Drawing Sheets

METHOD AND SYSTEM FOR EVALUATING INTEREST OF A TESTED ANIMAL

BACKGROUND OF THE INVENTION

1. Field of the Invention

The invention relates to the evaluation of animals, more particularly to a method and apparatus for evaluating interest of a tested animal.

2. Description of the Related Art

A conventional sucrose preference test, which was proposed by Willner P et al in 1987, is a method for measuring interest, depression degree or anti-depression therapy reaction of a tested animal, such as a mouse.

In the conventional sucrose preference test shown in FIG. 1, a tested mouse 91, which has not been fed with water for 24 hours, is contained in a housing 92 that is provided with a first dispenser 93 for dispensing non-flavored drinking water, and a second dispenser 94 for dispensing a liquid containing 2–3% of sucrose. The first dispenser 93 dispenses the drinking water at a first position that is easily accessible to the tested mouse 91 and that is at the same level as a second position at which the second dispenser 94 dispenses the liquid containing sucrose. The positions of the first and second dispensers 93, 94 are then interchanged after 30 minutes. Thereafter, amounts of the drinking water and the liquid containing sucrose consumed by the tested mouse 91 within one hour is measured, as shown in FIG. 2.

It is known in the art that the tested mouse 91 has a natural preference toward a liquid having a sweet taste. Therefore, under normal conditions, the consumed amount of the liquid containing sucrose is greater than that of the drinking water. In view of Willner's research, it is assumed that preference to sucrose is a measure of interest of the tested mouse 91, i.e., the tested mouse 91 loses interest for the liquid containing sucrose when depressed or stressed, thereby resulting in a reduced consumed amount of the liquid containing sucrose. The interest of the tested animal 91 for the liquid containing sucrose will not recover until depression or stress disappears.

However, the consumed amount of the liquid containing sucrose obtained from the conventional sucrose preference test divided by the weight of the tested mouse 91 has no distinct variation for the depressed or stressed condition, as pointed out in "Chronic Mild Stress and Sucrose Consumption: Validity as a Model of Depression", Naida F. Forbes et al, Physiology & behavior, Vol. 60, No. 6, pp. 1481–1484, 1996. Since the first and second dispensers 93, 94 dispense respectively drinking water and the liquid containing sucrose at the first and second positions that are at the same level, the conventional sucrose preference test actually measures the preference or need of the tested mouse 91 with respect to the liquid containing sucrose. For instance, the tested mouse 91 is likely to drink more of the liquid containing sucrose when hungry, and more of the drinking water when thirsty such that the correlation between the consumed amount of the liquid containing sucrose and depression or stress cannot be verified.

SUMMARY OF THE INVENTION

Therefore, the main object of the present invention is to provide a method and apparatus for evaluating interest of a tested animal.

According to one aspect of the present invention, there is provided a method for evaluating interest of a tested animal. The method comprises the steps of:

a) in a closed space for containing the tested animal, providing a first dispenser for dispensing a vital first liquid, and a second dispenser for dispensing a second liquid, the first dispenser dispensing the first liquid at a first position that is easily accessible to the tested animal, the second dispenser dispensing the second liquid at a second position higher than the first position so as to be less easily accessible to the tested animal;

b) measuring amounts of the first and second liquids consumed by the tested animal within a predetermined time period; and c) comparing the consumed amounts of the first and second liquids measured in step b) to evaluate interest of the tested animal.

According to another aspect of the present invention, there is provided an apparatus for evaluating interest of a tested animal. The apparatus comprises:

a housing that confines a closed space for containing the tested animal;

a first dispenser mounted on the housing, the first dispenser dispensing a vital first liquid at a first position that is easily accessible to the tested animal contained in the closed space; and a second dispenser mounted on the housing, the second dispenser dispensing a second liquid at a second position higher than the first position so as to be less easily accessible to the tested animal contained in the closed space.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
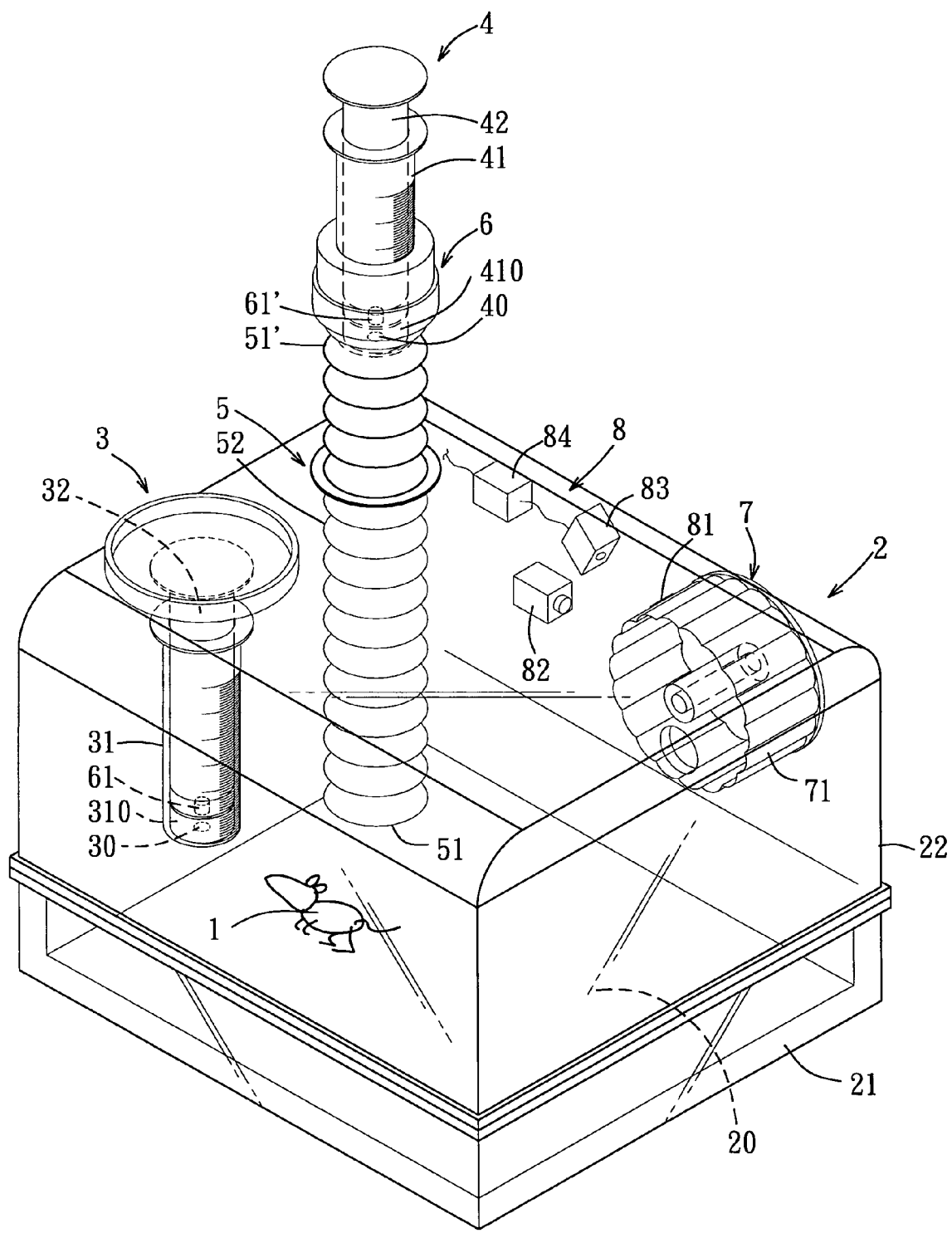
FIG. 4 is a perspective view illustrating a system for performing the method of the preferred embodiment.
Figure 5:
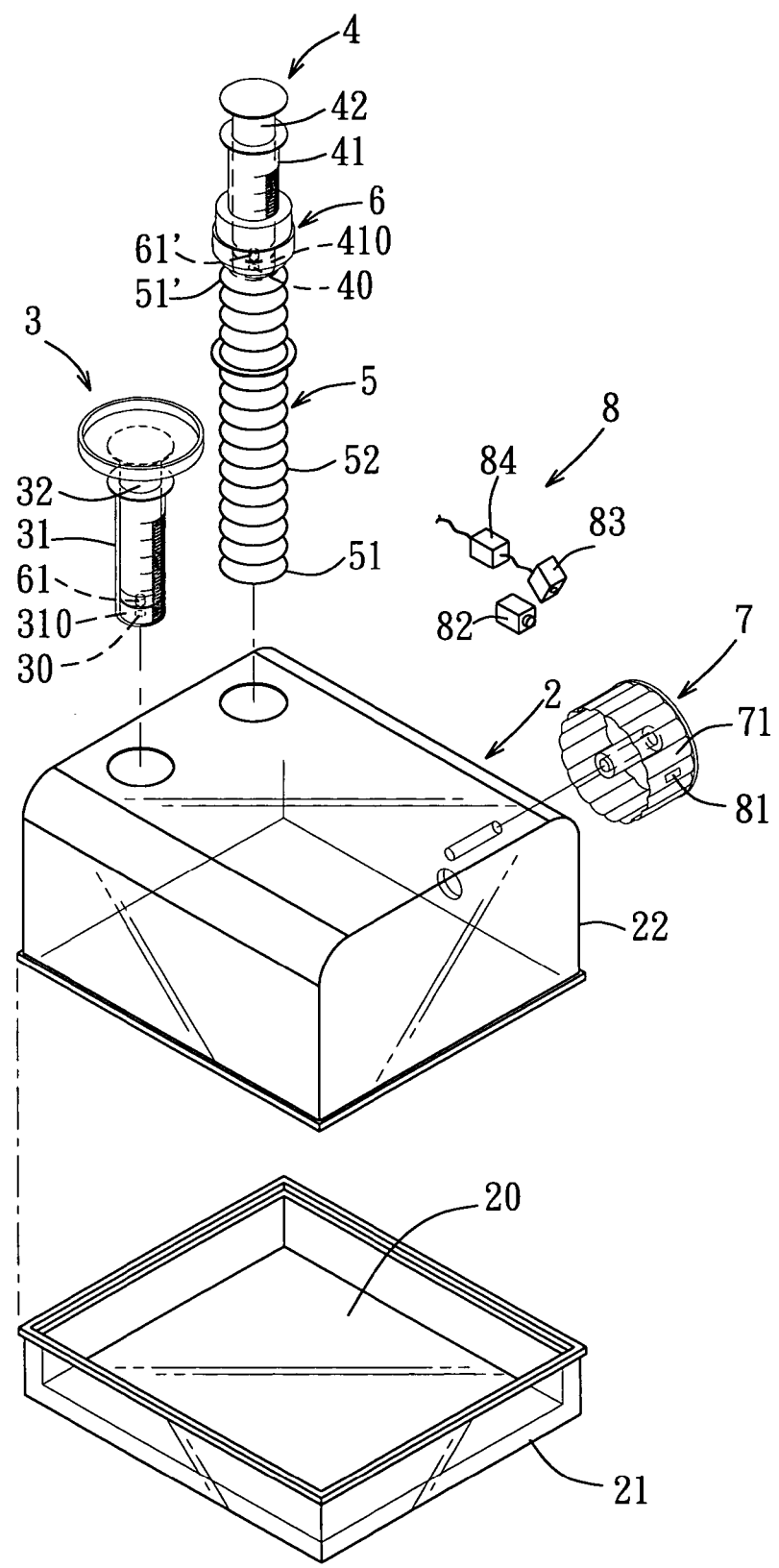
FIG. 5 is an exploded perspective view showing the system of FIG. 4.

Referring to FIGS. 4 and 5, a system for performing the preferred embodiment of the method for evaluating interest of a tested animal 1 according to the present invention is shown include a housing 2, a first dispenser 3, a second dispenser 4, an exercise unit 7, and a counting unit 8. In this embodiment, ten C57BL/6 or BALB/c mice, which have an average weight within a range of 23–25 grams, are used as the tested animal 1.

The housing 2 has transparent first and second housing parts 21, 22 that confine a closed space 20 for containing the tested animal 1.

The first dispenser 3 is mounted on the housing 2. The first dispenser 3 dispenses a vital first liquid via a first outlet 30, which is disposed at a first position that is easily accessible to the tested animal 1 contained in the closed space 20. In this embodiment, the vital first liquid is non-flavored drinking water. The first dispenser 3 includes a barrel 31 formed with the first outlet 30, a plunger 32 disposed in the barrel 31 and cooperating with the barrel 31 to confine a first accommodating space 310 for accommodating the first liquid, and a sensor 61 mounted on the plunger 32 and disposed in the first accommodating space 310 for detecting amount of the first liquid dispensed by the first dispenser 3, thereby permitting measuring of amount of the first liquid consumed by the tested animal 1 contained in the closed space 20. In this embodiment, the sensor 61 can be a supersonic wave transceiver.

The second dispenser 4 is mounted on the housing 2. The second dispenser 4 dispenses a second liquid via a second outlet 40, which is disposed at a second position higher than the first position so as to be less easily accessible to the tested animal 1 contained in the closed space 20. In this embodiment, the second liquid contains sucrose. It is noted that the second liquid can also be soft drink or an alcoholic drink. The second dispenser 4 includes a barrel 41 formed with the second outlet 40, a plunger 42 disposed in the barrel 41 and cooperating with the barrel 41 to confine a second accommodating space 410 for accommodating the second liquid, and a sensor 61' mounted on the plunger 42 and disposed in the second accommodating space 410 for detecting amount of the second liquid dispensed by the second dispenser 4, thereby permitting measuring of amount of the second liquid consumed by the tested animal 1 contained in the closed space 20. In this embodiment, the sensor 61' can be a supersonic wave transceiver.

A ladder 5, which is in the form of a tube, is received in the housing 2, and has opposite upper and lower open end portions 51', 51. The upper open end portion 51' is mounted on the barrel 41 of the second dispenser 4 and is disposed around the second outlet 40. The lower open end portion 51 is disposed in the closed space 20 at a position that is easily accessible to the tested animal 1 contained in the closed space 20. As such, the tested animal 1 is required to climb the ladder 5 to gain access to the second dispenser 4.

The exercise unit 7 is mounted in the housing 2. In this embodiment, the exercise unit 7 includes a running wheel 71 mounted rotatably in the housing 2.

Figure 9:
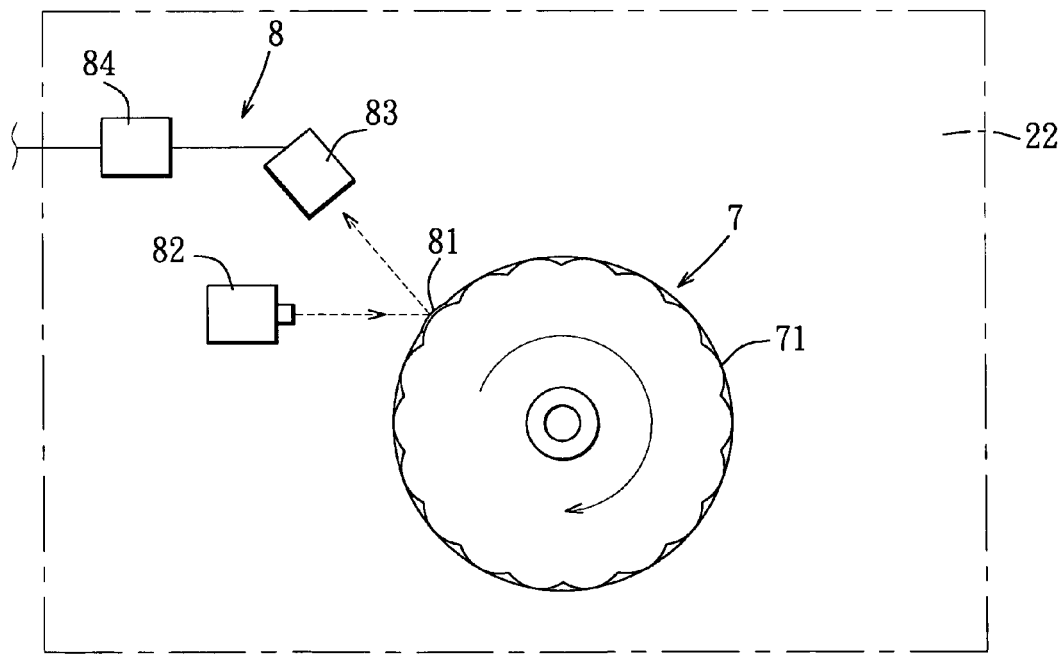
FIG. 9 is a schematic diagram showing the arrangement of an exercise unit and a counting unit of the system of FIG. 4.

The counting unit 8 is operably associated with the running wheel 71 for measuring motion amount of the tested animal 1 contained in the closed space 20. In this embodiment, the motion amount of the tested animal 1 is in terms of a distance run by the tested animal 1 in the closed space 20 within a predetermined time period. As best shown in FIG. 9, the counting unit 8 includes a light emitter 82, a light reflector 81, a light receiver 83, and a counter 84. The light emitter 82 is mounted in the housing 2. The light reflector 81 is mounted on the running wheel 71, and is capable of reflecting light emitted by the light emitter 82. The light receiver 83 is mounted in the housing 2, and is operable so as to receive the light reflected by the light reflector 81 during rotation of the running wheel 71 as a result of running of the tested animal 1 thereon and so as to generate a corresponding output signal. The counter 84 is coupled electrically to and receives the output signal from the light receiver 83 such that number of revolutions of rotation of the running wheel 71 resulting from running of the tested animal 1 in the closed space 20 within the predetermined time period can be counted.

Figure 1:
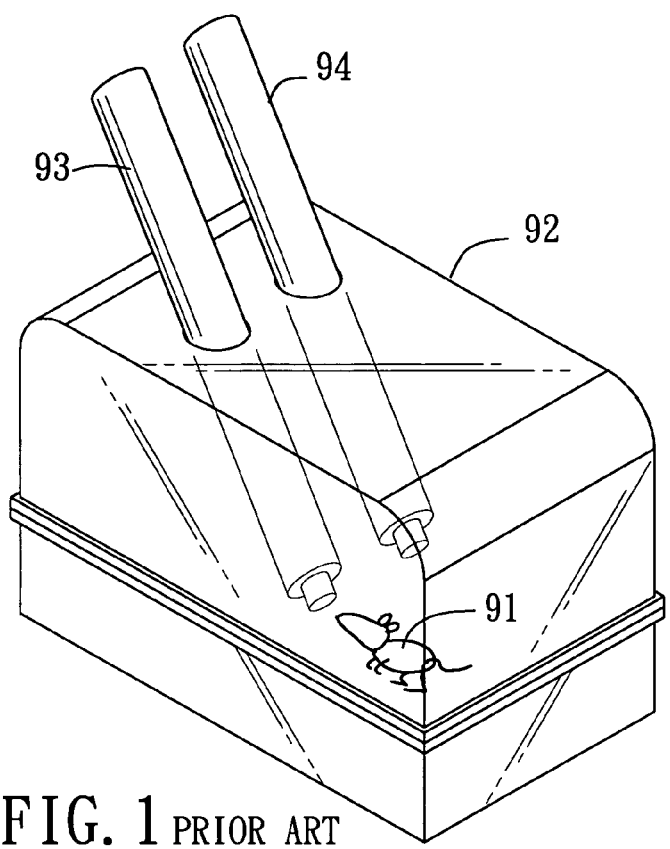
FIG. 1 is a perspective view of a conventional system for a sucrose preference test of a mouse.
Figure 2:
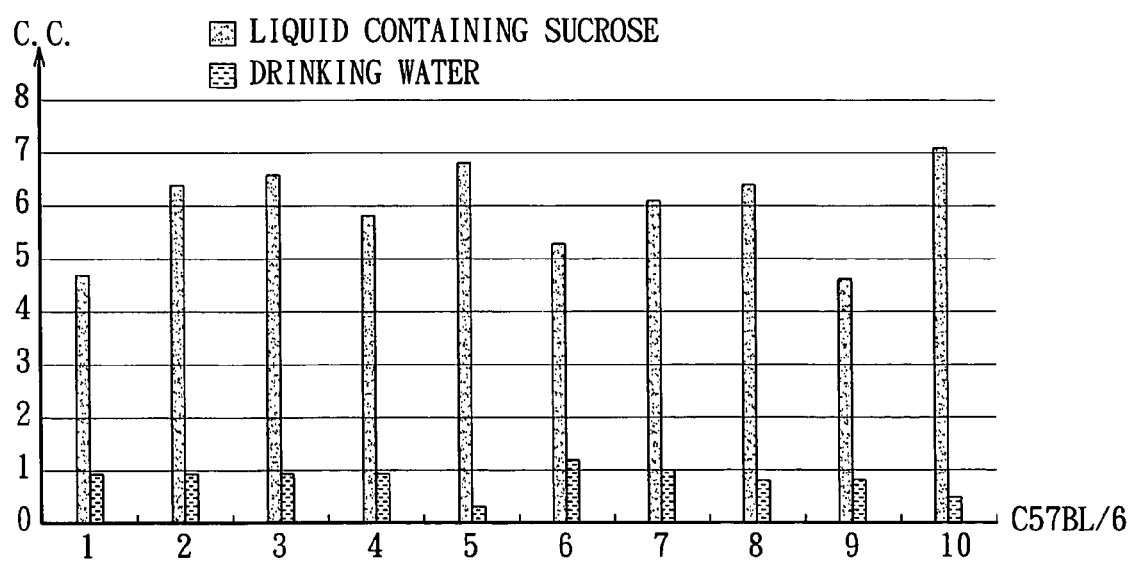
FIG. 2 is a bar chart illustrating amounts of drinking water and a liquid containing sucrose consumed by tested mice using the system of FIG. 1 within a period of one day.
Figure 3:
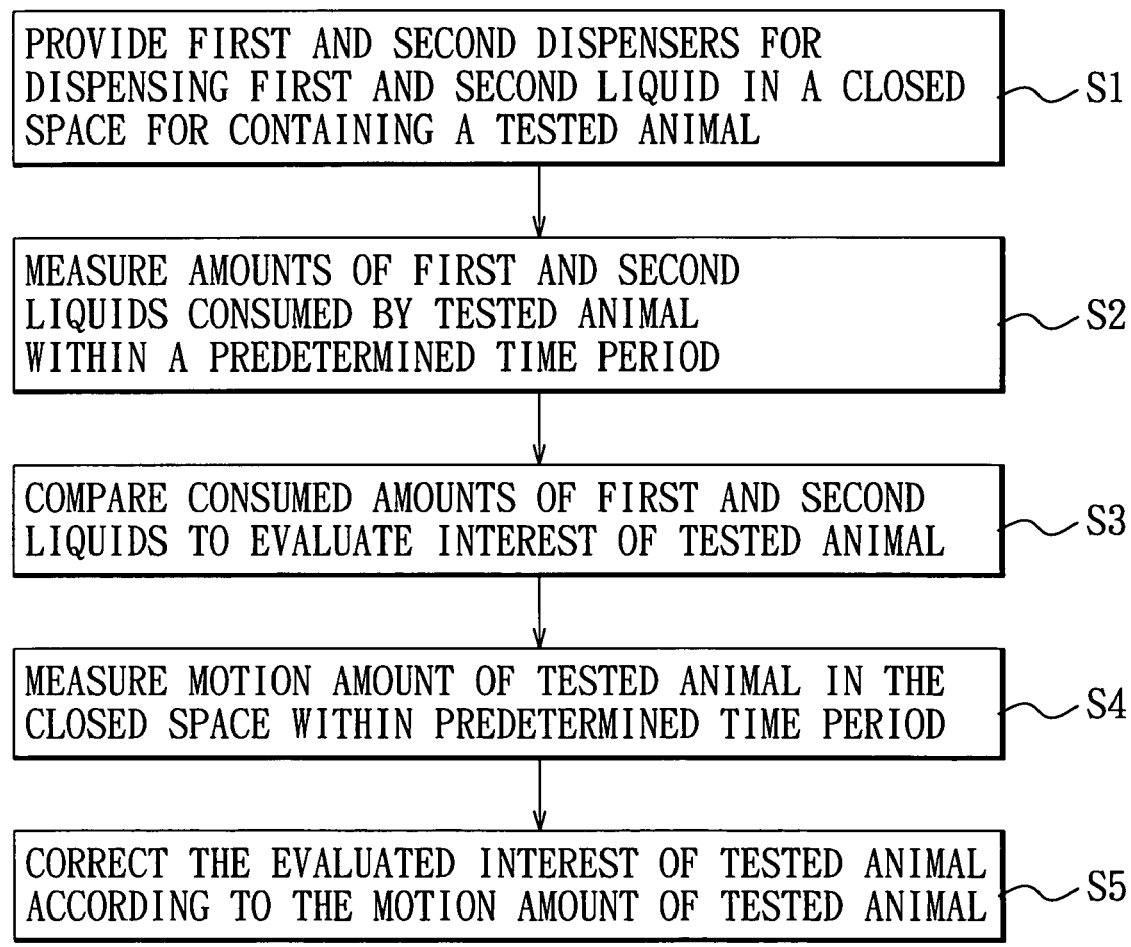
FIG. 3 is a flowchart illustrating the preferred embodiment of a method for evaluating interest of a tested animal according to this invention.

Referring to FIG. 3, there is shown a flow chart to illustrate the method of the preferred embodiment. In step S1, the first and second dispensers 3, 4 are provided in the closed space 20 that contains a tested animal 1 therein. In step S2, the sensors 61, 61' measure amounts of the first and second liquids consumed by the tested animal 1 within a predetermined time period, such as one day. In step S3, the consumed amounts of the first and second liquids measured in step S2 are compared to evaluate interest of the tested animal 1.

Figure 6:
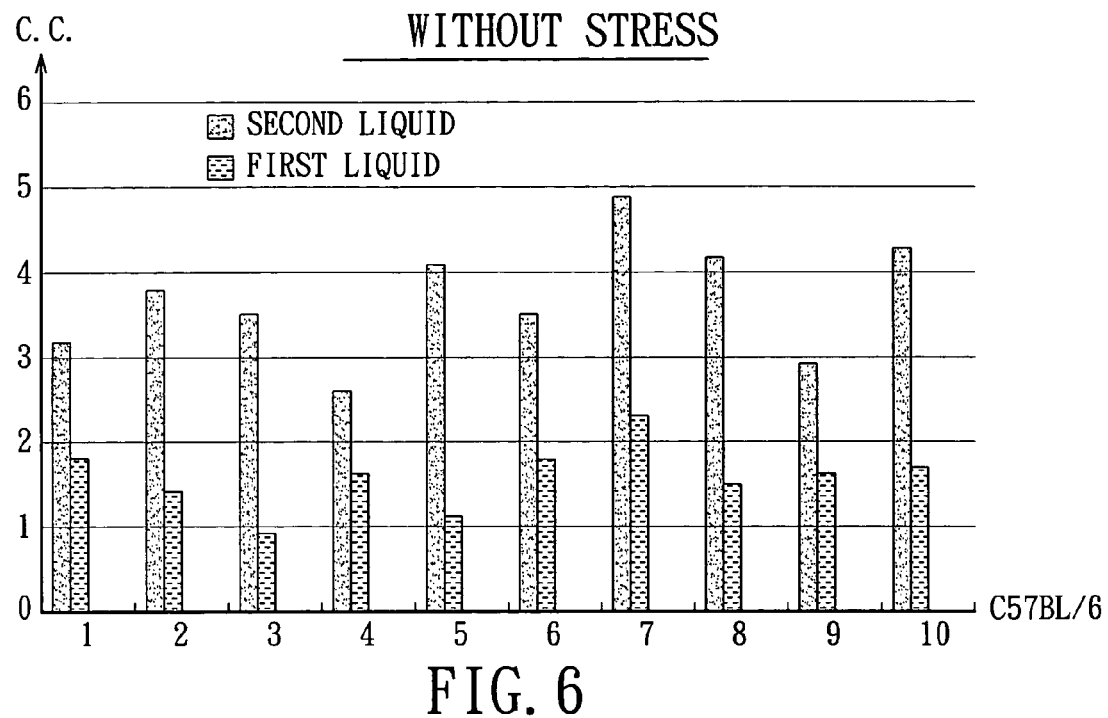
FIG. 6 is a bar chart illustrating amounts of first and second liquids consumed by non-stressed tested mice obtained according to the method of the preferred embodiment.
Figure 7:
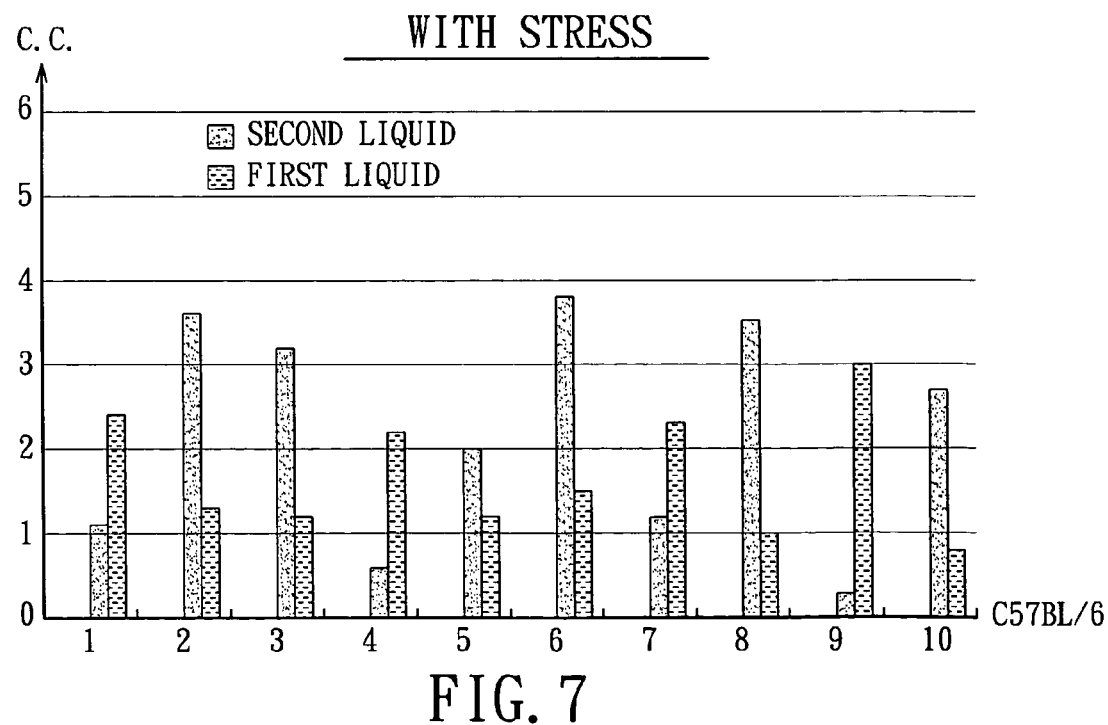
FIG. 7 is a bar chart illustrating amounts of the first and second liquids consumed by stressed tested mice obtained according to the method of the preferred embodiment.

FIGS. 6 and 7 show results of an experiment conducted to verify whether stress can reduce interest of the tested animals 1 numbered 1 to 10 according to the method of the preferred embodiment. In the case that the tested animal 1 is not stressed, the consumed amount of the second liquid is greater than that of the first liquid, and the average difference between the consumed amounts of the first and second liquids is about 2 C.C., as shown in FIG. 6. However, in the case that the tested animal 1 is stressed, for the tested animals 1 numbered 2, 3, 5, 6, 8, 10, the consumed amounts of the second liquid are greater than that of the first liquid, but for the tested animals 1 numbered 1, 4, 7, 9, the consumed amounts of the second liquid are distinctly less than that of the first liquid, as shown in FIG. 7. In view of the above results, each of the tested animals 1 has a different reaction to stress.

Figure 8:
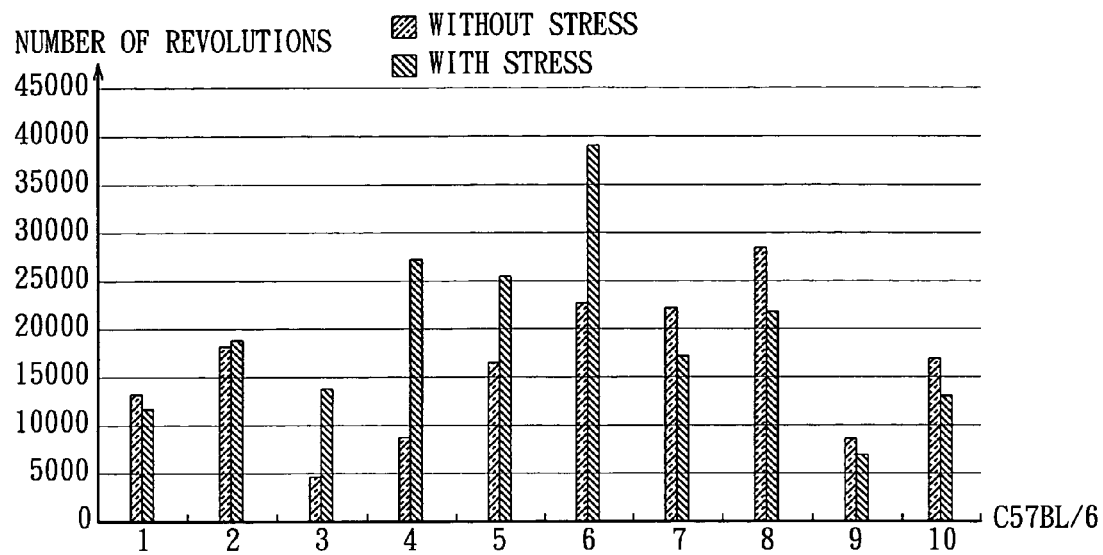
FIG. 8 is a bar chart illustrating motion amounts of the tested mice obtained according to the method of the preferred embodiment.

In order to ensure validity of the results of the above experiment, health conditions of the tested animals 1 should be monitored. In step S4, the counting unit 8 measures motion amount of the tested animal 1 in the closed space 20 within the predetermined time period as reference for health conditions of the tested animals 1. In this embodiment, it is assumed that the tested animal 1 whose motion amount within the predetermined time period does not reach 300 revolutions regardless of the condition, i.e., with or without stress, is regarded to be unhealthy. As shown in FIG. 8, the motion amounts of the tested animals 1 are over 300 regardless of the condition, i.e., with or without stress, of the tested animals 1.

In step S5, the evaluated interest of the tested animal 1 obtained in step S3 is corrected according to the motion amount of the tested animal 1 measured in step S4. That is, according to the above assumption for health conditions, the experimental result corresponding to the tested animal 1 that is regarded to be unhealthy due to the motion amount thereof being less than 300 revolutions is not adopted.

To sum up, since the location of the second outlet 40 of the second dispenser 4 is higher than that of the first outlet 30 of the first dispenser 3, it is required for the tested animal 1 to make more efforts to drink the second liquid. Therefore, the method of this invention can be used to effectively evaluate interest of the tested animal 1.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A system for evaluating interest of a tested animal, comprising:
a housing that confines a closed space for containing the tested animal;
a first dispenser mounted on said housing, said first dispenser dispensing a vital first liquid at a first position that is easily accessible to the tested animal contained in the closed space;
a second dispenser mounted on said housing, said second dispenser dispensing a second liquid at a second position higher than the first position so as to be less easily accessible to the tested animal contained in the closed space;
an exercise unit mounted in said housing, said exercise unit including a running wheel mounted rotatably in said housing; and
a counting unit operably associated with said running wheel for measuring motion amount of the tested animal in said closed space, said counting unit including:
(i) a light emitter mounted in said housing;
(ii) a light reflector mounted on said running wheel and capable of reflecting light emitted by said light emitter;
(iii) a light receiver mounted in said housing and operable so as to receive the light reflected by said light reflector during rotation of said running wheel and so as to generate a corresponding output signal; and
(iv) a counter coupled electrically to and receiving the output signal from said light receiver.

2. The system as claimed in claim 1, further comprising a ladder received in said housing such that the tested animal is required to climb said ladder to gain access to said second dispenser.

3. The system as claimed in claim 1, wherein each of said first and second dispensers is provided with a sensor for detecting amount of the liquid dispensed thereby, thereby permitting measuring of amounts of the first and second liquids consumed by the tested animal in the closed space.

4. The system as claimed in claim 1, wherein the first liquid is non-flavored drinking water.

5. The system as claimed in claim 1, wherein the second liquid contains sucrose.

* * * * *